B. R. PARKINSON.
SECURING THE ENDS OF SERVICE PIPES TO GAS OR OTHER MAINS.
APPLICATION FILED OCT. 12, 1908.
968,258.
Patented Aug. 23, 1910.
2 SHEETS—SHEET 1.
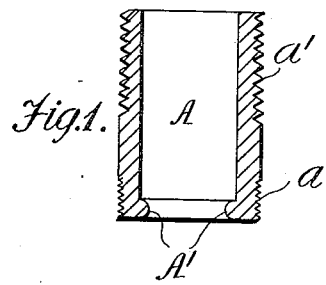
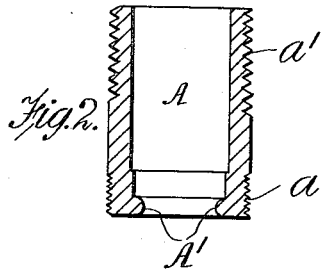
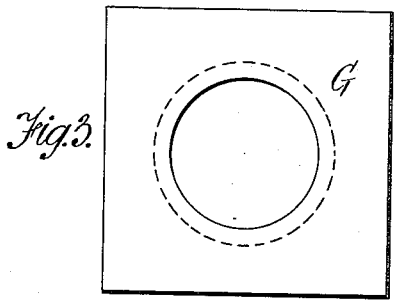
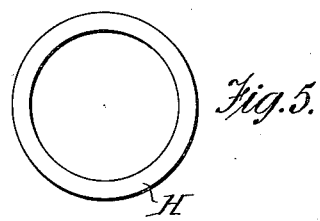
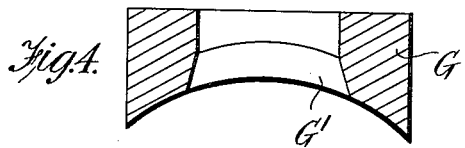
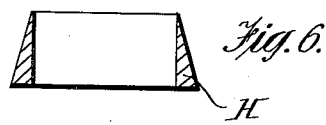
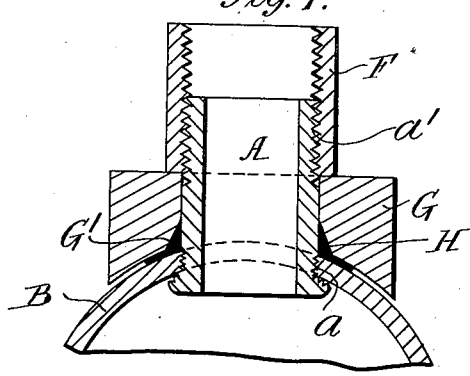
WITNESSES:
INVENTOR,
Bernard Robert Parkinson,
BY
ATTY.

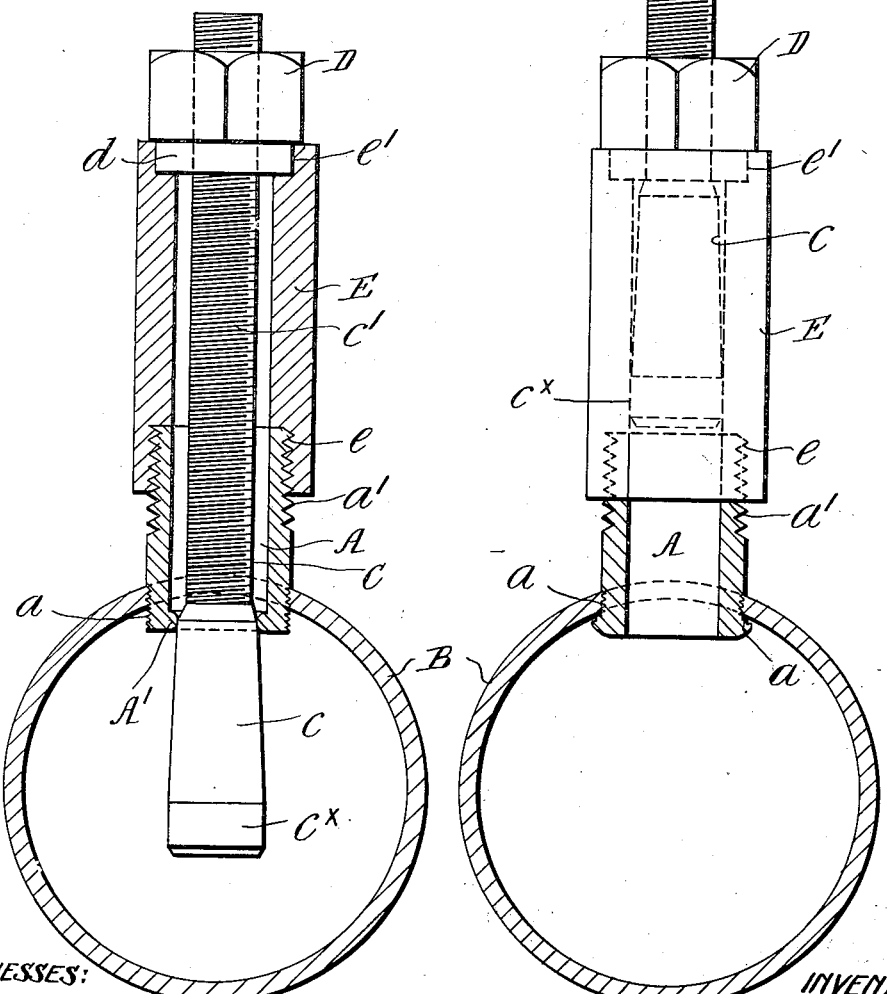

UNITED STATES PATENT OFFICE.

BERNARD ROBERT PARKINSON, OF LEIGHTON BUZZARD, ENGLAND, ASSIGNOR OF ONE-HALF TO HENRY WOODALL, OF WESTMINSTER, ENGLAND.

SECURING THE ENDS OF SERVICE-PIPES TO GAS OR OTHER MAINS.

968,258. Specification of Letters Patent. Patented Aug. 23, 1910.

Application filed October 12, 1908. Serial No. 457,404.

*To all whom it may concern:*

Be it known that I, BERNARD ROBERT PARKINSON, a subject of the King of Great Britain and Ireland, residing at Restholme, 5 Albany Road, Leighton Buzzard, in the county of Bedford, England, have invented new and useful Improvements Relating to Securing the Ends of Service-Pipes to Gas or other Mains, of which the following is a specification.

The invention is primarily intended to overcome the difficulty of making an efficient connection between service pipes and steel mains where the metal of the latter is only of sufficient thickness to allow two or three tapping threads.

In carrying out the invention the nipple or short length of pipe is provided internally at its lower end with an annular bead or projection. A hole is drilled and tapped in the main in the usual way and the nipple or short length of pipe is screwed in until its lower end, with the internal bead, projects within the main to the required extent. The riveting of the nipple or short length of pipe is effected by means of a tapered mandrel or, if desired, a punch provided at its forward end with an enlarged portion, the greatest diameter of which is approximately equal to the internal diameter of the body of the nipple or short length of pipe. The enlarged portion of the mandrel or the punch is drawn or driven right through the nipple or short length of pipe and passing the bead or projection expands same and rivets it over the inner surface of the main leaving the nipple or the like of equal bore through its length. After the nipple or short length of pipe has been secured firmly to the main a gas or water tight joint is made more secure by means of any suitable arrangement of saddle, such as that hereinafter described. The nipple is then connected to the service pipe in any suitable manner.

In order that my invention may be thoroughly understood I will now refer to the accompanying drawings.

Figures 1 and 2 are sections of expansible nipples which have been found to give good results in practice. Figs. 3 and 4 are a plan and section of a cast iron saddle and Figs. 5 and 6 are corresponding views of a gutta-percha ring for use with the saddle. Figs. 7 and 8 are sections, respectively illustrating a nipple of the form shown in Fig. 1 screwed into a main ready to be expanded, and said nipple expanded, as well as one form of tool by which the riveting or expansion can be effected. Fig. 9 is a section showing the completed joint ready to be connected to the service pipe.

In carrying out my invention I make use of an expansible nipple or short length of pipe A which is provided at the lower end of its exterior surface with the requisite number of threads $a$ of suitable fineness, say twenty threads to the inch, and at the upper portion of its exterior with a suitable number of threads $a'$ to enable it to be connected to the gas or water service pipe. The nipple A is further provided at the interior surface of its inner end with an annular bead or thickened portion $A'$. The remainder of the interior of the nipple may be formed with a bore of the same diameter throughout, as shown in Figs. 1 and 7, or it may be made with a bore of two slightly different diameters arranged as shown in Fig. 2. In the latter case the sides of the smaller diameter, which would only extend upward to a level with the top of the screw $a$, would be also expanded by the mandrel until the bore of the nipple was of uniform size throughout. The main B is tapped with a thread corresponding to the screwed portion $a$ of the nipple A and after the nipple has been screwed into the main B the beaded or thickened portion $A'$ is expanded or riveted over on to the inner surface of the main by means of any suitable tool.

A tool which I have found to be convenient for the purpose of expanding the nipple is shown in Figs. 7 and 8. This tool consists of a screwed mandrel C, a nut D and a sleeve E. The mandrel is provided with a tapered portion $c$ which effects the expansion of the beaded or thickened portion $A'$ and a screwed part $c'$ of considerable length which engages with the nut D. The sleeve E is formed at its lower end with a screwed recess $e$, which engages with the upper screwed part $a'$ of the nipple A, and preferably with a recess $e'$ adapted to receive a corresponding round part $d$ formed on the nut D. The forward end of the tapered portion $c$ of the mandrel is preferably provided with a cylindrical extension $c^x$ so as to allow for wear. In using this tool the sleeve is first screwed on to the nipple. The mandrel is then passed into the sleeve and is secured in operative position therein by threading the nut on to the screwed portion of the mandrel and turning the nut until its lower face bears against the top of the sleeve and the coned portion of the mandrel is drawn tight up against the beaded or thickened portion of the nipple. The nipple, carrying the tool, is then screwed into the tapped hole in the main and riveting or expansion effected by turning the nut. The tool is then removed from the expanded nipple which can afterward be connected up to the service pipe. As shown in Fig. 9 I prefer to effect the connection by means of a socket F engaging with the screw $a'$ and bearing against a cast iron saddle G, the lower end of which is formed with a recess G′ for the reception of a compressible gutta-percha ring H. The saddle piece is preferably made of square shape in plan, as shown in Fig. 3, so that it can be held against movement by a spanner, when the socket is being screwed home.

Instead of expanding the nipple by means of the above described tool the expansion may be effected by other tools, such as a punch or mandrel having a head of bulbous form adapted to be driven downward by means of a hammer. The punch would be provided with suitable means for enabling it to be withdrawn, such as a projection by which it could be knocked out by a hammer, and its stem would be of sufficient length to prevent the mandrel dropping into the main.

If desired the lower end of a nipple of the above described kind could be made of tapered shape and be left unscrewed in which case said end would be forced into a correspondingly shaped hole in the main and then expanded as above described.

Having now described my invention, what I have invented and desire to secure by Letters Patent of the United States of America is as follows:—

A nipple for securing a service pipe to a main formed on the lower part of its exterior surface with a number of fine threads and on the upper portion of its exterior surface with a number of coarser screw threads, said nipple being provided at the extremity of its inner end with an internal bead of such a size as to afford the necessary substance for allowing the inner end of the nipple to be expanded on to the surface of the main.

In testimony whereof I have signed my name to this specification in the presence of two subscribing witnesses.

BERNARD ROBERT PARKINSON.

Witnesses:
PERCY PHILLIPPS,
CHARLES FLETCHER ENNIS.